US012710869B2

(12) United States Patent
Dubey et al.

(10) Patent No.: US 12,710,869 B2
(45) Date of Patent: Aug. 18, 2026

(54) DUAL-PORT USB FLASH DRIVE FOR ON-THE-GO (OTG) SUPPORTED DEVICES

(71) Applicant: SanDisk Technologies LLC, Austin, TX (US)

(72) Inventors: Sankalp Dubey, Bangalore (IN); Narendhiran Chinnaanangur Ravimohan, Bangalore (IN); Ramanathan Muthiah, Bangalore (IN)

(73) Assignee: SANDISK TECHNOLOGIES LLC, Austin, TX (US)

( * ) Notice: Subject to any disclaimer, the term of this patent is extended or adjusted under 35 U.S.C. 154(b) by 40 days.

(21) Appl. No.: 18/662,632

(22) Filed: May 13, 2024

(65) Prior Publication Data

US 2025/0348216 A1 Nov. 13, 2025

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ........ G06F 3/06; G06F 3/0655; G06F 3/0679; G06F 13/38; G06F 13/382; G06F 13/385; G06F 13/387
See application file for complete search history.

(56) References Cited

U.S. PATENT DOCUMENTS 9,495,375 B2 * 11/2016 Huang .................. G06F 16/148
9,729,692 B2 8/2017 Goel
11,169,584 B2 11/2021 Peter et al.
2006/0277334 A1 * 12/2006 Sim ....................... G06F 3/0688 710/62
2008/0052439 A1 2/2008 Young et al.
2015/0134893 A1 5/2015 Anderson et al.
2015/0193167 A1 7/2015 Hokari et al.
2016/0070313 A1 3/2016 Wu
2020/0166980 A1 * 5/2020 Wu ..................... H02J 7/00038

FOREIGN PATENT DOCUMENTS

KR 20150072248 A 6/2015
WO 2017096526 A1 6/2017

OTHER PUBLICATIONS

International Search Report and Written Opinion for Application No. PCT/US25/11253, dated Apr. 29, 2025, 11 pages.

* cited by examiner

*Primary Examiner* — Idriss N Alrobaye
*Assistant Examiner* — Richard B Franklin
(74) *Attorney, Agent, or Firm* — LOZA & LOZA, LLP; Gabriel Fitch

(57) ABSTRACT

An on-the-go (OTG) drive is configured to mount to a mobile phone. The OTG drive has a J-shaped configuration with a form factor sized so that a main body of the OTG drive can be positioned along the back side of the mobile device with a universal serial bus (USB) plug connector of the OTG drive connected into a socket port at the bottom end of the mobile device. The OTG drive also has a USB socket port facing away from the mobile device to enable connection of a secondary device, such as a laptop, via a USB connection cable. Among other features, the OTG drive enables access by a laptop and a mobile phone to the memory of the OTG drive while also permitting data transfer between the laptop and the mobile device. The OTG drive also enables charging of the mobile phone from a charger or laptop.

20 Claims, 11 Drawing Sheets

OTG DRIVE CONNECTED BETWEEN MOBILE PHONE AND CHARGER

OTG DRIVE CONNECTED TO MOBILE PHONE, LAPTOP OR OTHER HOST

OTG DRIVE CONNECTED BETWEEN MOBILE PHONE AND A SECOND OTG DRIVE OR OTHER PERIPHERAL DEVICE

DUAL-PORT USB FLASH DRIVE FOR ON-THE-GO (OTG) SUPPORTED DEVICES

FIELD

The disclosure relates, in some aspects, to data storage devices such as flash drives having non-volatile memory (NVM) arrays. More specifically, but not exclusively, the disclosure relates to flash drives for use with on-the-go (OTG) supported mobile devices.

INTRODUCTION

Data usage in consumer devices such as mobile phones is increasing, and as a result, larger memory capacities are often required. Many mobile phones are equipped with limited data storage capacity and lack expandable micro/nano flash drive card slots. To address this problem, universal serial bus (USB) on-the-go (OTG) features may be exploited. USB OTG is a feature that enables a mobile device to read data from USB devices such as flash drives (e.g., memory sticks or thumb drives). However, mobile devices configured for use with OTG often use the same port for OTG data transfer and mobile device charging. With such mobile devices, the user cannot access an OTG flash drive and charge the mobile device at the same time, nor can the user access a second USB device while also accessing the OTG flash drive. Moreover, many currently available OTG drives are not well-configured for ease of use. Aspects of the present disclosure are directed to addressing these and other issues and to providing OTG drives with additional functionality and convenience.

SUMMARY

The following presents a simplified summary of some aspects of the disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a portable data storage device that includes: a body containing a data storage controller and a memory; a first connector coupled to the data storage controller and configured to connect into a mobile device; and a second connector coupled to the data storage controller and configured to connect to a secondary device; wherein the portable data storage device is configured to couple with a bottom end of the mobile device such that: the body of the portable data storage device is positioned along a back side of the mobile device, the first connector is connected into a connection socket port on the bottom end of the mobile device, and the second connector is oriented away from the mobile device to connect to the secondary device. . . . For example, the portable data storage device may be an on-the-go (OTG) drive with universal serial bus (USB) connectors.

Another embodiment of the disclosure provides a portable data storage device that includes: a data storage controller; a memory; a first connector coupled to the data storage controller and configured to connect into a mobile device; and a second connector coupled to the data storage controller and configured to connect to a secondary device; wherein the data storage controller comprises one or more processors configured, individually or in combination, to control access by the mobile device to the memory of the portable data storage device via the first connector and to control access by the secondary device to a memory of the mobile device via the first connector and the second connector. For example, the portable data storage device may be an OTG drive with USB connectors.

Yet embodiment of the disclosure provides an apparatus that includes: means for controlling the storage of data in a memory of the apparatus; a first connector coupled to the means for controlling the storage of data and configured to connect into a mobile device; and a second connector coupled to the means for controlling the storage of data and configured to connect to a secondary device; wherein the means for controlling the storage of data further comprises means for controlling access by the mobile device to the memory of the apparatus via the first connector, and means for controlling access by the secondary device to a memory of the mobile device via the first connector and the second connector.

DETAILED DESCRIPTION

Figure 1:
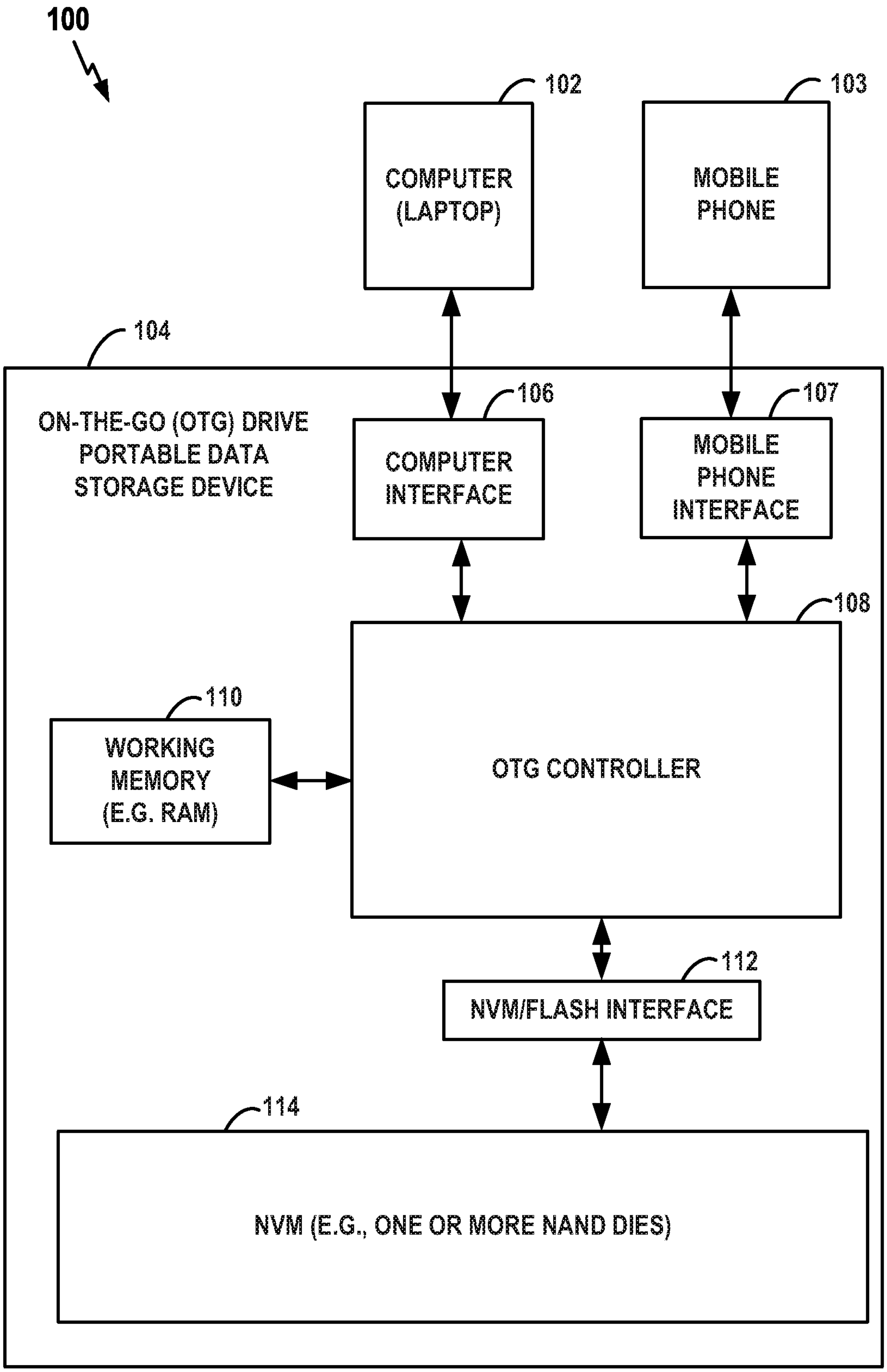
FIG. 1 is a schematic block diagram configuration for an exemplary on-the-go (OTG) drive, according to aspects of the present disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Some aspects herein relate to portable data storage devices (DSD) having non-volatile memory (NVM), such as solid-state devices (SSDs), e.g., NAND flash memory storage devices (herein "NANDs"). (A NAND is a type of non-volatile storage technology that does not require power to retain data. It exploits negative-AND, i.e., NAND, logic.) Other aspects relate to data storage controllers for controlling DSDs, such as the data storage controller of an SSD. To provide a concrete example, a portable SSD having one or more NVM NAND dies will be used below in the description of various embodiments. It is understood that at least some aspects described herein may be applicable to other forms of SSDs as well. For example, at least some aspects described herein may be applicable to phase-change memory (PCM) arrays, magneto-resistive random access memory (MRAM) arrays, and resistive random access memory (ReRAM) arrays. Features may be implemented within a CMOS direct bonded (CBA) NAND chip or die (wherein CMOS refers to a complementary metal-oxide-semiconductor). Features may also be implemented within 3D XPoint memory cores, ferroelectric random-access memory (FeRAM) cores, and other types of memory cores. In some embodiments, one or more of the memory modules or portions thereof may be configured as other types of storage class memory (SCM). Generally speaking, the memory modules may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

Overview

As noted above, mobile phones are often equipped with limited data storage capacity and lack expandable micro/nano flash drive card slots. To address this, universal serial bus (USB) on-the-go (OTG) features may be exploited to enable the mobile device to read data from USB devices such as flash drives. However, mobile devices configured for use with OTG often use the same port for OTG data transfer and device charging. So, with such mobile devices, the user cannot access an OTG drive and charge the mobile device at the same time, nor can the user access a second USB device while also accessing the OTG drive.

To address these and other issues, a dual-port OTG storage drive is described herein. The OTG drive may include, for example: a USB-C/Lightning (male) plug connector for providing storage access to a mobile phone host; a USB-C/Lightning (female) socket connector for mobile charging and laptop connectivity; a controller; and several system sub-modules, which may be physical circuits such as hardware or firmware circuits or software modules. The OTG drive can be used, e.g., as storage and to establish connectivity in the following scenarios: (1) the OTG drive can connect to both a mobile phone and a laptop computer while enabling charging of the mobile phone, (2) the OTG drive can connect to a mobile phone and a mobile charger, (3) the OTG drive can connect to a single host (e.g., a laptop or a mobile phone), and (4) the OTG drive can connect with another USB OTG flash drive or peripheral.

In some aspects, the OTG drive includes one or more sub-modules such as a storage hub, a hub switch, an OTG detector, a host identifier, a programmable relay, a primary host enable module, and primary and secondary host detector modules. These modules serve various functionalities. For example, in a scenario where the OTG drive is connected to a mobile phone via the plug connector and another (i.e., second) OTG drive is connected to the socket port, the hub module enables access by the mobile phone to both the memory the OTG drive and the second OTG drive. Further, different sets of modules may be activated in different connection scenarios. For example, in a scenario where the OTG drive is connected to the mobile device and the laptop at the same time while supporting both the charging functionality and data transfer simultaneously, modules such as a storage HUB, a primary/secondary host module, a NAND controller, a charging controller, bridge/relay and switch modules are activated. Similarly, the NAND controller, charging controller, relay, and switch modules may be enabled when the OTG drive is connected to a mobile device and a charger at the same time.

Still further, in some aspects, the OTG drive exploits a form factor so the device can remain connected/attached to the backside of the mobile phone. For example, the OTG drive includes: a body containing a data storage controller and a memory; a first connector coupled to the data storage controller and configured to connect into a mobile device; and a second connector coupled to the data storage controller and configured to connect to a secondary device. The data storage controller includes one or more processors configured, individually or in combination, to control access by the mobile device to the memory of the OTG drive via the first connector and to control access by the secondary device to the memory via the second connector. The OTG drive has a J-shape that is configured to fit over the bottom end of the mobile device with: the body of the portable data storage device positioned along the back side of the mobile device; the first connector connected into a connection port on the bottom of the mobile device; and the second connector facing away from the mobile device.

Still further, in some aspects, the OTG drive is configured so that it can be connected to a mobile device and a laptop (or other computer) to provide the laptop access to the storage of the portable device and to the mobile device's internal storage. For example, the OTG drive may include: a body containing a data storage controller and a memory; a first connector coupled to the data storage controller and configured to connect into a mobile device; and a second connector coupled to the data storage controller and configured to connect to a computer; wherein the data storage controller comprises one or more processors configured, individually or in combination, to control access by the computer to the memory of the OTG drive via the first connector and to control access by the computer to a memory of the mobile device via the second connector. Thus, in some aspects, when the OTG drive is connected to the mobile device and a laptop (or other computer), the OTG drive provides the laptop with access to the OTG drive's storage and to the mobile device's internal storage.

These and other features will be described in detail in the following sections.

Exemplary Portable OTG Drive for Use with Laptop and Mobile Phone

FIG. 1 is a block diagram of a system 100 including an exemplary OTG drive 104 configured as a solid state device (SSD) with NVM, which may be flash NAND NVM. The OTG drive 104 is configured to provide OTG access to the NVM by both a computer 102 (e.g., a laptop) and a mobile phone 103 (e.g., a smartphone). For example, the computer 102 may provide a write command to the OTG drive 104 for writing user data to an NVM 114 of the OTG drive 104 or a read command for reading user data from the NVM 114, with access by the computer 102 to the NVM 114 under the control of an OTG controller 108 of the OTG drive 104. Likewise, the mobile phone 103 may provide a write command to the OTG drive 104 for writing user data to the NVM 114 or a read command for reading user data from the NVM 114, with access to the NVM 114 by the mobile phone 103 also under the control of the OTG controller 108. Still further, in some aspects, the computer 102 may be permitted to access a memory of the mobile phone 103 under the control of the OTG controller 108, and/or the mobile phone 103 may be permitted to access a memory of the computer 102 under the control of the OTG controller 108 of the OTG drive 104. The OTG controller 108 may also enable charging of the mobile phone 103 by the computer 102 (or other suitable charging device).

In the primary examples herein, the computer 102 is a laptop computer. However, computer 102 may be any secondary system or device needing data storage or retrieval and a compatible interface for communicating with the OTG drive 104. For example, the computer 102 may be a computing device, a desktop computer, a personal computer, a portable computer, a workstation, a server, a personal digital assistant, a digital camera, an Internet of Things (IoT) device, or even another mobile phone (in addition to the mobile phone 103). In some examples, rather than being a computer, the secondary device may instead be a mobile phone charger or other charging device. Still further, in some examples, the secondary device may be any other USB device or device accessible via USB or similar communication interface.

In the example of FIG. 1, the OTG drive 104 includes a computer interface 106 for interfacing with computer 102 and a mobile phone interface 107 for interfacing with mobile phone 103. The OTG drive 104 also includes the OTG controller 108, a working memory 110 (such as random access memory (RAM)), an NVM interface 112 (which may be referred to as a flash interface), and the NVM 114, such as one or more NVM NAND dies or NVM arrays.

In the primary examples described herein, the computer interface 106 and the mobile phone interface 107 are both USB interfaces. However, in other examples, any suitable communication interface may be used, such as a Non-Volatile Memory Express (NVMe) interface, a Serial Peripheral (SP) interface, an Advanced Technology Attachment (ATA), or Serial Advanced Technology Attachment (SATA) interface, a Serial Attached Small Computer System Interface (SCSI) (SAS), an IEEE 1394 (Firewire) interface, or the like.

OTG controller 108 controls the operation of the OTG drive 104. In some aspects, the controller 108 receives commands from computer 102 through the computer interface 106 and performs the commands to transfer data between computer 102 and NVM 114. In some aspects, the controller 108 receives commands from the mobile phone 103 through the mobile phone interface 107 and performs the commands to transfer data between the mobile phone 103 and NVM 114. Furthermore, the controller 108 may manage reading from and writing to memory 110 for performing the various functions effected by the OTG interface controller and to maintain and manage cached information in working memory 110.

The OTG controller 108 may include any type of processing device, such as a microprocessor, a microcontroller, an embedded controller, a logic circuit, software, firmware, or the like, for controlling the operation of the OTG drive 104. In some aspects, some or all of the functions described herein as performed by the controller 108 may instead be performed by another element of the OTG drive 104. For example, the OTG drive 104 may include a microprocessor, a microcontroller, an embedded controller, a logic circuit, software, firmware, or any kind of processing device, for performing one or more of the functions described herein as being performed by the controller 108.

The working memory 110 may be any suitable memory or system capable of storing data. For example, the memory 110 may be ordinary RAM, DRAM, double data rate (DDR) RAM (DRAM), static RAM (SRAM), synchronous dynamic RAM (SDRAM), flash storage, an erasable programmable read-only-memory (EPROM), an electrically erasable programmable ROM (EEPROM), or the like. In various embodiments, the controller 108 uses the working memory 110, or a portion thereof, to store data during the transfer (transference) of data between the computer 102 or the mobile phone 103 and the NVM 114. For example, the memory 110 or a portion of the memory 110 may be a cache memory. The NVM 114 receives data from controller 108 via the NVM interface 112 and stores the data. The NVM 114 may be any suitable type of non-volatile memory, such as a NAND-type flash memory or the like.

Although FIG. 1 shows an exemplary OTG drive that is configured as an SSD with flash NAND NVM, the various disclosed embodiments are not necessarily limited to an SSD application/implementation. The disclosed NVM die and associated processing components can be implemented as part of a package that includes other processing circuitry and/or components. For example, a processor may include, or otherwise be coupled with, embedded NVM and associated circuitry and/or components. The processor could, as one example, offload certain tasks to the NVM and associated circuitry and/or components.

Figure 2:
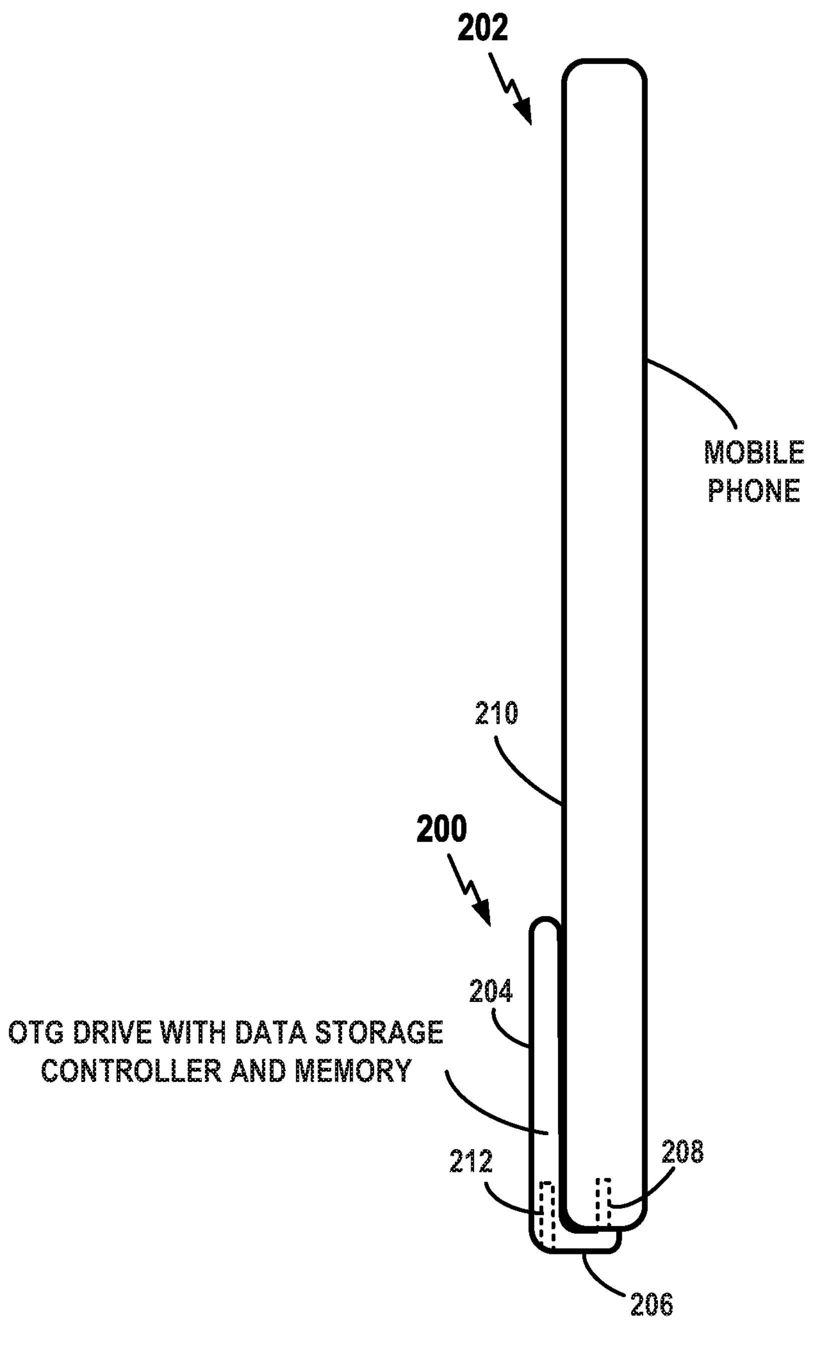
FIG. 2 is a side elevational view of an OTG drive mounted into the bottom of a mobile phone, with the OTG drive configured according to aspects of the present disclosure.

FIG. 2 provides a side elevational view of an OTG drive 200 mounted into the bottom of a mobile phone 202. The OTG drive 200 has a J-shape (or U-shape) configuration that includes a flat main body 204, which includes a data storage controller, NVM, etc., a lower base portion 206 that extends at a right angle (perpendicular) to the main body 204, and a USB plug 208 (which may also be referred to as a male USB connector) that extends up at a right angle (perpendicular) to the base portion 206 (and thus parallel to the main body 204). The USB plug 208 is connected (connectable) into a USB socket (which may also be referred to as a female USB port), not separately shown, of the mobile phone 202 so as to connect the OTG drive 200 into the mobile phone 202 with the main body 204 of the OTG drive 200 snugly flat against a back surface 210 of the mobile phone 202. Within FIG. 2, plug 208 is shown in dashed lines since it is inside the mobile phone 202 and would otherwise be obscured from view in the drawing.

The flat main body 204 of the OTG drive 200 includes a USB socket 212 (i.e., a female USB connection jack), also shown in dashed lines. A USB cable (not shown) with a USB plug may be inserted into socket 212. The various USB plugs and sockets may be, for example, USB-C/lightning plugs and sockets. Although not shown in FIG. 2, the USB cable may be connected to a mobile phone charger, a laptop computer, or other USB capable device. To accommodate room for a mobile phone case (not shown in the figure), the lower base 206 of the OTG drive 200 may be configured to be telescoping or otherwise extendable/retractable. This enables the main body 204 to be placed a selected offset distance from surface 210 of the mobile phone 202 to accommodate an intervening case so that the body 204 can be positioned snugly adjacent to a back surface of the case. Additionally or alternatively, different sizes/shapes of the OTG drive 200 may be sold, some configured to fit onto a mobile phone with a case and others designed to fit onto a mobile phone without a case. Different colors and visual designs/textures may be provided so that the OTG drive matches the user's phone/case.

Note also that, in some implementations, the socket 212 is positioned so that its slot opening faces downwardly out of the flat main body 204 to permit a USB plug of a USB cable to be inserted upwardly into the socket 212 from below. In other implementations, the socket 212 is instead positioned so its slot opening faces sideways out of the flat main body 204 (i.e., in a direction perpendicular to the figure) to permit a USB cable to be inserted into the socket 212 from the side. In still other implementations, the socket 212 is instead positioned so its slot opening extends into the connecting portion 206 to permit a USB cable to be inserted into the socket 212 from the left side of the figure. Other configurations are possible as well.

The J-shaped configuration of the OTG drive 200 enables the OTG drive 200 to be mounted securely to the mobile phone 202 so as to provide extra memory accessible to the mobile phone 202. The OTG drive 200 may remain mounted to the mobile phone 202 more or less permanently to provide the user with an ongoing supply of extra memory. That is, in a typical use case scenario, the user mounts the OTG drive 200 to the mobile phone 202 and leaves it mounted to the phone to provide extra memory until the user sells or trades in the phone, at which point the user may then remove the OTG drive 200 and mount it to a new mobile phone. The user could, of course, remove and re-mount the OTG drive 200 more frequently, perhaps to swap the OTG drive 200 among multiple mobile phones. Notably, the OTG drive 200 is relatively thin compared to the mobile phone 202 and thus does not interfere with ordinary usage of the phone while also enabling the mobile phone to be placed easily into pockets or purses, etc.

Whenever the mobile phone needs to be recharged, a USB charging cable may be inserted into socket 212 with charge transferred from a wall socket into the mobile phone via plug 208. Alternatively, the mobile phone could be charged by connecting a USB cable between a laptop computer and the socket 212, with charge transferred from the laptop into the mobile phone via plug 208. Other charging devices and scenarios can be employed as well.

Figure 3A:
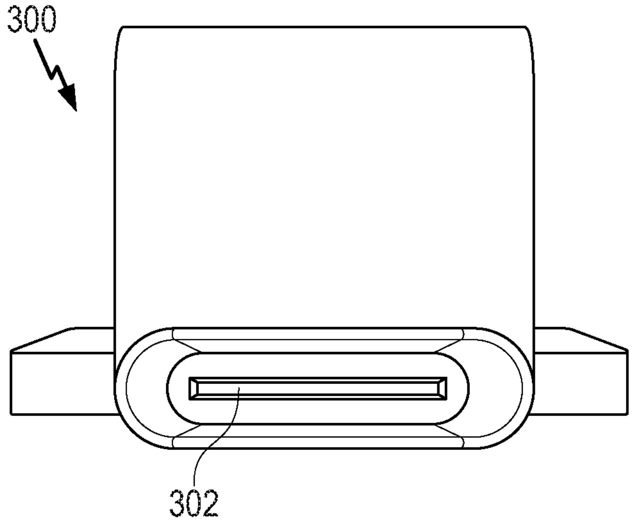
FIG. 3A is a bottom view of an OTG drive, configured according to aspects of the present disclosure, and showing a USB-C/lightning socket for connecting a laptop computer.
Figure 3B:
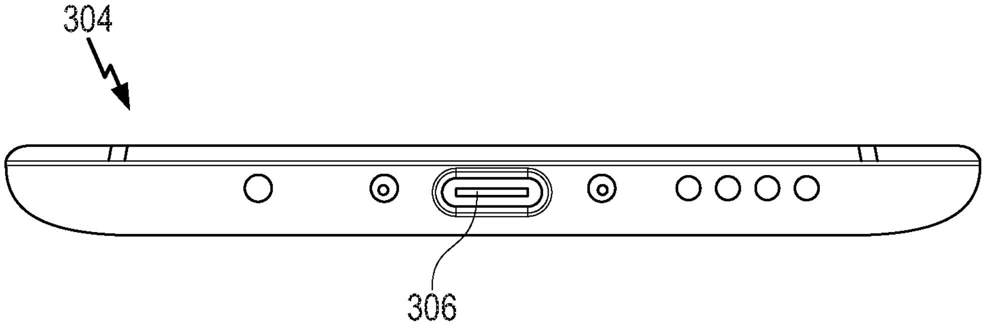
FIG. 3B is a bottom view of a mobile phone without the OTG drive and, in particular, showing a USB-C/lightning socket of the mobile phone.
Figure 3C:
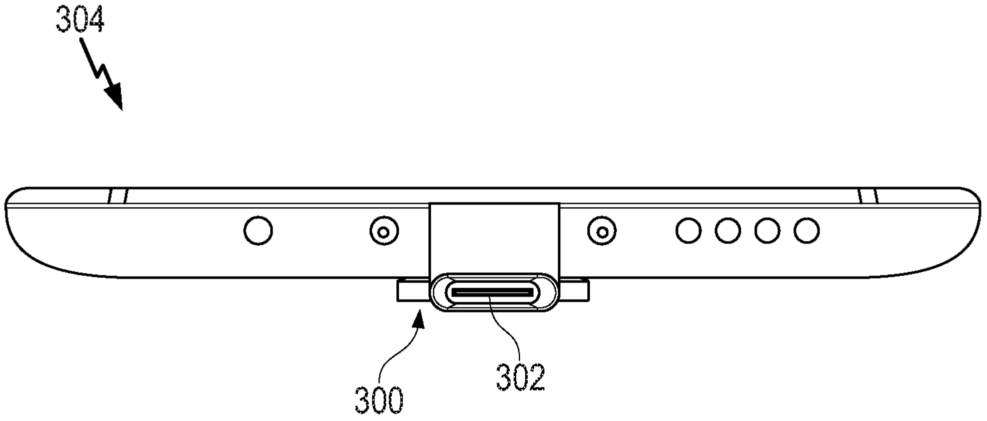
FIG. 3C is a bottom view of a mobile phone with the OTG drive, configured according to aspects of the present disclosure, mounted into the mobile phone.

FIG. 3A illustrates a bottom view of an OTG drive 300 showing a USB-C/lightning socket 302 (i.e., a female USB jack) corresponding to socket 212 of FIG. 2. FIG. 3B shows a bottom view of a mobile phone 304 without the OTG drive 300 mounted and, in particular, showing a USB-C/lightning socket 306 of the mobile phone 304. FIG. 3C shows a bottom view of the mobile phone 304 with the OTG drive 300 mounted.

Among other features, the OTG drive may provide the following functionality.

- The OTG drive can connect to both mobile and laptop at the same time.
- If the OTG drive is connected to only a mobile phone, the OTG drive will function simply as an OTG drive.
- The OTG drive can be connected to other hosts as well, i.e., laptops, tablets, and other OTG-supported devices.
- If the OTG drive is connected to both a mobile and a laptop, then from the laptop, both the OTG drive and the mobile internal storage directory are accessible.
- The OTG drive detects whether a charger, host, or OTG drive is connected.
- The OTG drive can support various charging protocols such as battery charge (BC), USB power delivery (PD), and Quick Charging (QC) protocols and is compatible with USB specifications.
- The OTG drive's internal USB hub functionality may be disabled to save power until a laptop and mobile are both connected. Once the laptop is detected, the OTG drive enables HUB to access both the OTG drive and mobile internal storage.
- While a first OTG drive is connected to mobile and a second OTG drive is connected to a port of the first OTG drive, the first OTG drive can enable a multi-device hub to access both the first OTG drive storage and connected flash drive or peripheral functionality.
- If the second OTG drive also includes multiple ports, then yet another OTG drive (i.e., a third OTG drive) can be connected to the second OTG drive. In general, any number of such OTG drives might be connected in a daisy chain configuration.

In the next section, various configurations of internal modules/components of the OTG drive will be described, along with various methods and functions.

Exemplary Internal Component Configurations/Methods for Portable OTG Drive

Figure 4:
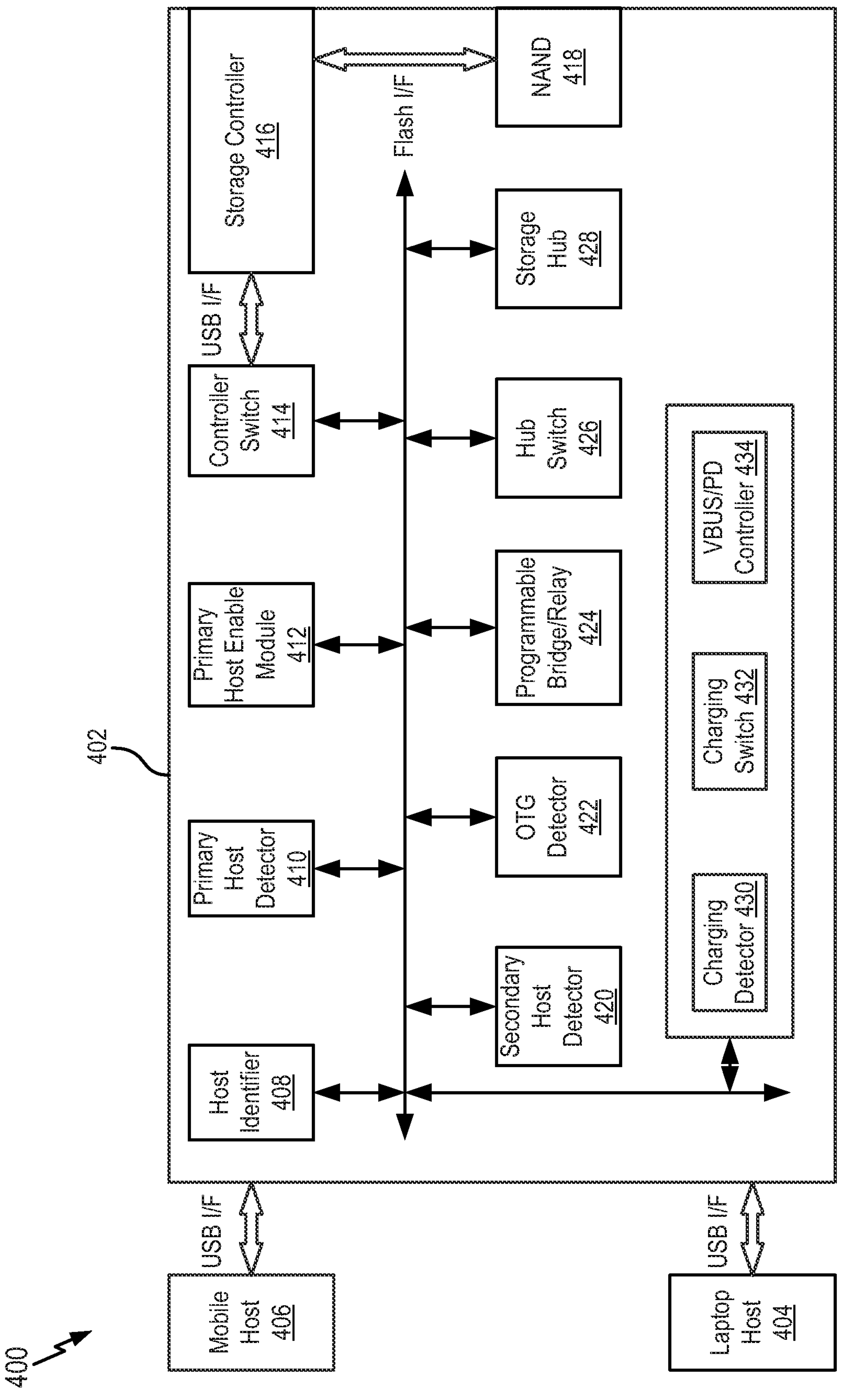
FIG. 4 is a block diagram of a system including an OTG drive connected to both a laptop computer and a mobile phone, particularly illustrating functional modules of the OTG drive configured according to aspects of the present disclosure.

FIG. 4 is a block diagram of a system 400 including an OTG drive 402 connected to both a laptop host 404 and a mobile phone (host) 406. Various "backend" modules within the OTG drive 402 are shown. The OTD drive 402 includes a host identifier 408, which identifies the type of host(s) connected to its ports, i.e., laptop, mobile device, charger, etc. A primary host detector 410 determines or detects which host is the primary host. For example, a mobile phone may be identified as the primary host. A primary host enable module 412 enables access to the OTG drive by the primary host. This may be achieved by activating a controller switch 414 that is connected to a data storage (NAND) controller 416, which is in turn connected to a NAND 418. The primary host is thus enabled to access the NAND 418. Additionally, the OTG drive 402 includes a secondary host detector 420 that determines or detects which host is the secondary host. For example, a laptop may be identified as the secondary host. An OTG detector 422 detects or determines whether the secondary host is another OTG drive. A programmable bridge/relay 424 provides a bridge or relay between the two hosts (primary and secondary). A hub switch 426 is activated if the OTG drive is intended to function as a hub between two hosts. A storage hub 428 controls access to the NAND 418 if the OTG is operating as a hub between hosts (with actual access to NAND provided via the controller switch 414, etc.) Still further the system includes a charging detector 430 that detects when charging is needed, a charging switch 432 that enables charging, and a VBUS/PD controller 434 that controls either PD charging or Voltage BUS (VBUS) charging.

Table I summarizes which of the modules of FIG. 4 is enabled in various connection scenarios.

| S. No. | OTG drive connection | Modules enabled |
|---|---|---|
| 1. | Mobile and Laptop with charging | Storage HUB, Primary/Secondary host, Storage controller, VBUS/PD controller, Bridge, Switch |
| 2. | Mobile with charging | Primary host, Storage controller, VBUS/PD controller, Relay, Switch |
| 3. | Any host | Primary host, Storage controller |
| 4. | Another pen drive or peripheral connected to the OTG drive | OTG detector, Storage HUB, Bridge, Switch, Storage controller |

Thus, in some aspects, the OTG drive 402 has integrated submodules, such as storage hub 428, hub switch 426, and secondary host detector modules 420, that together enable an otherwise standard (retail) OTG storage drive to support an inbuilt USB interface port to charge a mobile at the same time, while a laptop accesses the mobile internal and OTG drive storage for IO purposes. The OTG drive 402 drive dynamically manages its components: the storage hub 428, hub switch 426, and OTG detector 422, along with the primary and secondary host detector modules 410, 420.

In some aspects, when the OTG drive 402 is in an OTG mode (with the OTG drive 402 connected to the mobile phone) and the charging detector circuit 430 detects charging via one or its ports (not shown), the programmable relay 424 switches on voltage protection and then switches on a battery charging circuit within the VBUS/PD controller 434, which connects the (external) charger to the mobile phone 406 via the OTG drive 402.

In an arrangement with a second host (a laptop), when the OTG drive 402 is in an OTG mode (i.e., the OTG drive 402 is connected to a mobile phone 406), a charging method is triggered when the laptop is connected to the inbuilt charging port of OTG drive 402. The OTG drive 402 disconnects the existing OTG connection from mobile phone 406, then further enables the hub 428, and re-establishes the connection to the second host (laptop) 404 while simultaneously or concurrently charging the mobile phone 406. Enabling the hub 428 enables access to both mobile internal storage and OTG drive storage (NAND 418) from the laptop.

Additionally, a multi-device hub function may be enabled wherein laptop-type hosts can also be connected, where the OTG drive 402 is exposed as a new storage device. Note that the OTG drive 402 with multi-port support does not merely enable a port; it can also accommodate IPs such as detector circuits (for another host, such as secondary host detector 420)), connection establishment functions, and other related functions. The OTG drive 402 also can detect the type of connected device to its ports, such as another flash drive and peripherals, via the OTG detector 422. While the OTG drive 402 is connected to a mobile phone 406 and another OTG drive is connected to the secondary port, the OTG drive 402 can enable a multi-device hub function to access both the OTG drive 402 storage and a connected flash drive or peripheral functionality.

Figure 5:
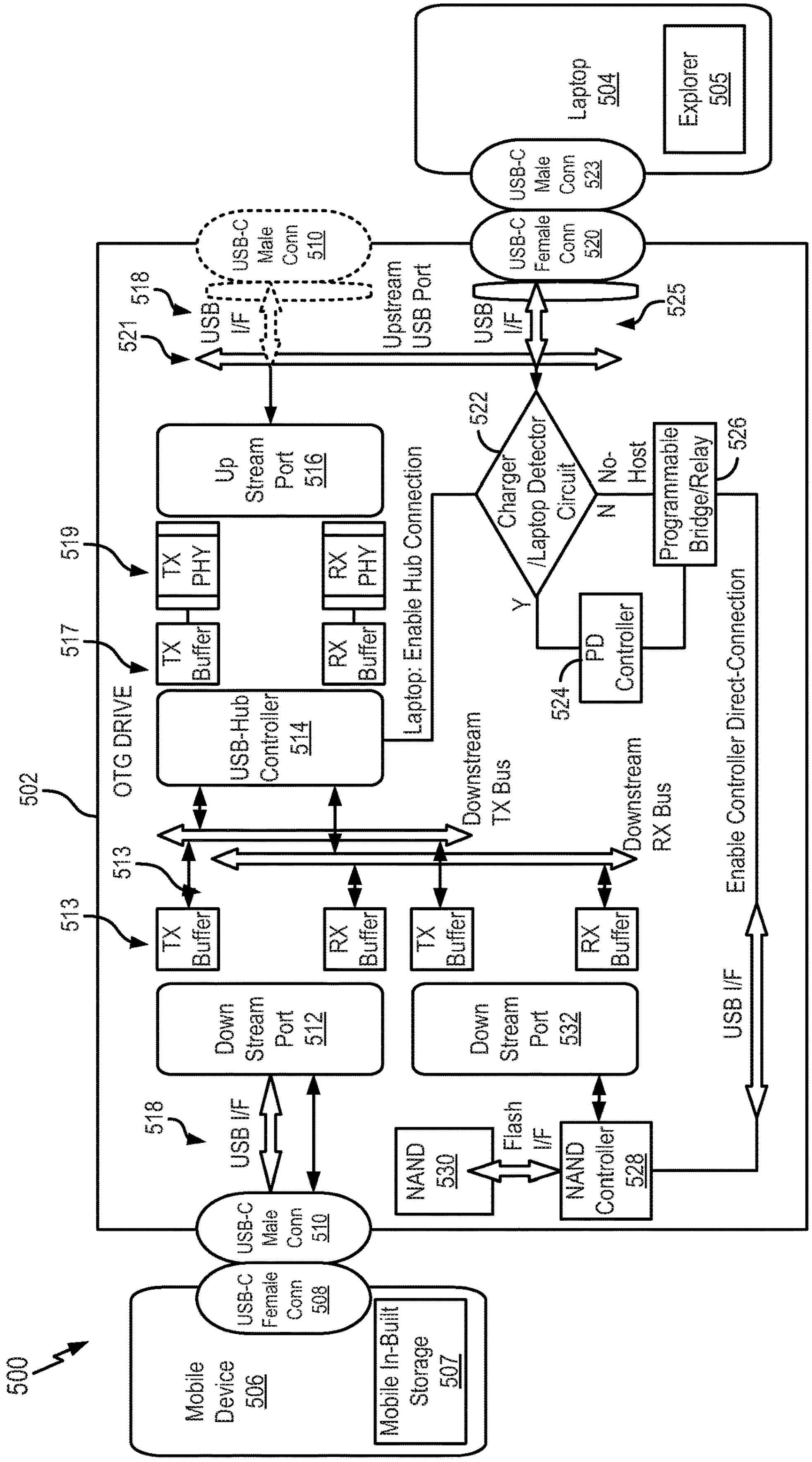
FIG. 5 is a block diagram of a system including an OTG drive connected to both a laptop and a mobile phone device, particularly illustrating hardware components of the OTG drive configured according to aspects of the present disclosure.

FIG. 5 is a block diagram of a system 500 including an OTG drive 502 connected to both a laptop 504 and a mobile phone device 506. Whereas FIG. 4 highlighted various functional modules, FIG. 5 provides various hardware details, including the primary and secondary ports (which are referred to as upstream and downstream ports in FIG. 5). The mobile device 506 includes in-built storage 507 and the laptop 504 includes various storage components (not separately shown), which are accessible via a file explorer component 505.

The mobile device 506 includes a USB-C female socket connector 508, which mates with a USB-C male plug connector 510 of the OTG drive 502. The overall downstream port includes a first downstream port 512, which is coupled to connector 510 via a USB interface bus 518 and to a USB hub controller 514 via various receive and transmit buffers 513 and buses 515, as shown. The USB hub controller 514 is, in turn, connected through various receive and transmit buffers 517 and physical layers (PHY) 519 to an upstream port 516 which is connected via a bus 521 and another USB I/F bus 525 and to a USB-C female connector 520 of the OTG drive, which mates with a corresponding USB male connector 523 of the laptop 504 (or to a USB cable that is connected to the laptop 504). Note that FIG. 5 also illustrates the USB-C male connector 510 in phantom lines as being connected via USB/I/F bus 518 and bus 521 to the up stream port 516. This is because, depending upon the OTG drive system configuration, the USB-C male connector 510 can function as part of the downstream (or down-facing) port 512 or as part of the upstream (or up-facing) port 516, i.e., depending on whether the OTG drive is connected only to a mobile device 506 or to both a laptop 504 and a mobile device 506. The USB-C male connector 510 is shown in phantom lines on the right side of the figure to clarify that the OTG drive of FIG. 5 does not have two separate USB-C male connectors. There is only a single USB-C male connector 510 in this embodiment. (In other embodiments, two or more USB-C male connectors could be provided.)

Additional components shown in FIG. 5 include a charger/laptop detector circuit 522, which, upon detecting a laptop or charger connected to the OTG drive, sends a hub enablement signal to the USB controller 514 and sends a suitable signal to a PD controller 524, which controls charging of the OTG drive device from the laptop or charger. The PD controller 524 then notifies a programmable bridge/relay circuit 526, which transmits a signal to a NAND controller 528 (e.g., a data storage controller corresponding to controller 416 of FIG. 4) to enable a direct connection from either the mobile device 506 or the laptop 504 to a NAND 530 of the OTG drive 502. A second downstream port 532 is connected to the NAND controller 528 and the USB hub controller 514 via the various receive and transmit buffers 513 and buses 515.

Thus, there are two downstream ports, 512 and 532, which may be enabled in a configuration when the laptop and mobile are both connected. The first downstream port 512 is to establish a connection between the laptop 504 and the mobile device internal storage 507, and the second downstream port 532 is provided to connect the laptop 504 and the OTG drive 502. When the laptop 504 is connected to the USB-C female socket 520, the charger/laptop detector circuitry 522 detects if the laptop or only the charger is connected. If the laptop 504 is connected, then in a second step, the detector circuit (module) 522 sends an enable signal to the USB-Hub controller 514 as well as the PD controller 524 to identify the supported voltage to enable both of those modules. Once voltage negotiation is done via the PD controller 524 and the USB hub 514 is initialized, the programmable relay 526 disconnects direct connection with the NAND controller 528, which is in the default state currently. Then the USB-Hub controller 514 activates both down-stream ports 532 and 512. Once the ports 532 and 512 are enabled, the NAND controller 528 re-initializes and establishes a connection with the laptop 504 via USB-Hub 514 connected to port 532, as well as enabling configuration to set mobile device 506 as the device to read internal memory 507 data from laptop 504, which acts as a host. With this functionality, both OTG-drive flash data and mobile internal memory data are accessible by the laptop 504.

In another scenario, if only a charger is connected to the OTG drive 502, detector circuitry 522 identifies the connected charger and sends a signal to PD controller 524 to negotiate charging voltage requirements. In this function, the USB hub 514 is in a disabled state, and the programmable bridge/relay 526 is in a connected state, which establishes a direct connection with the mobile device 506. In the default state, the USB-C female connector 520 is in the not connected (NC) state. And the NAND controller 528 is connected to upstream port 516, which establishes a connection with mobile device 506.

Note also that, if the charger/laptop detector circuit 522 does not detect either a laptop or charger, a "no-host" signal is sent from detector circuit 522 to the programmable bridge/relay circuit 526. This bypasses the PD controller 524. The programmable bridge/relay circuit 526 then sends a suitable signal to the NAND controller 528 to enable a direct connection from the mobile device 506 to the NAND 530 of the OTG drive 502.

The OTG drive of FIGS. 4 and 5 can be used as storage and to establish connectivity in at least the following four use case scenarios:

1. OTG drive connected between a mobile phone and a laptop with charging.
2. OTG drive connected to mobile phone and a charger.
3. OTG drive connected to mobile phone host only.
4. OTG drive connected with another OTG flash drive or peripheral.

These four scenarios will be further described with reference to the next set of figures.

Figure 6:
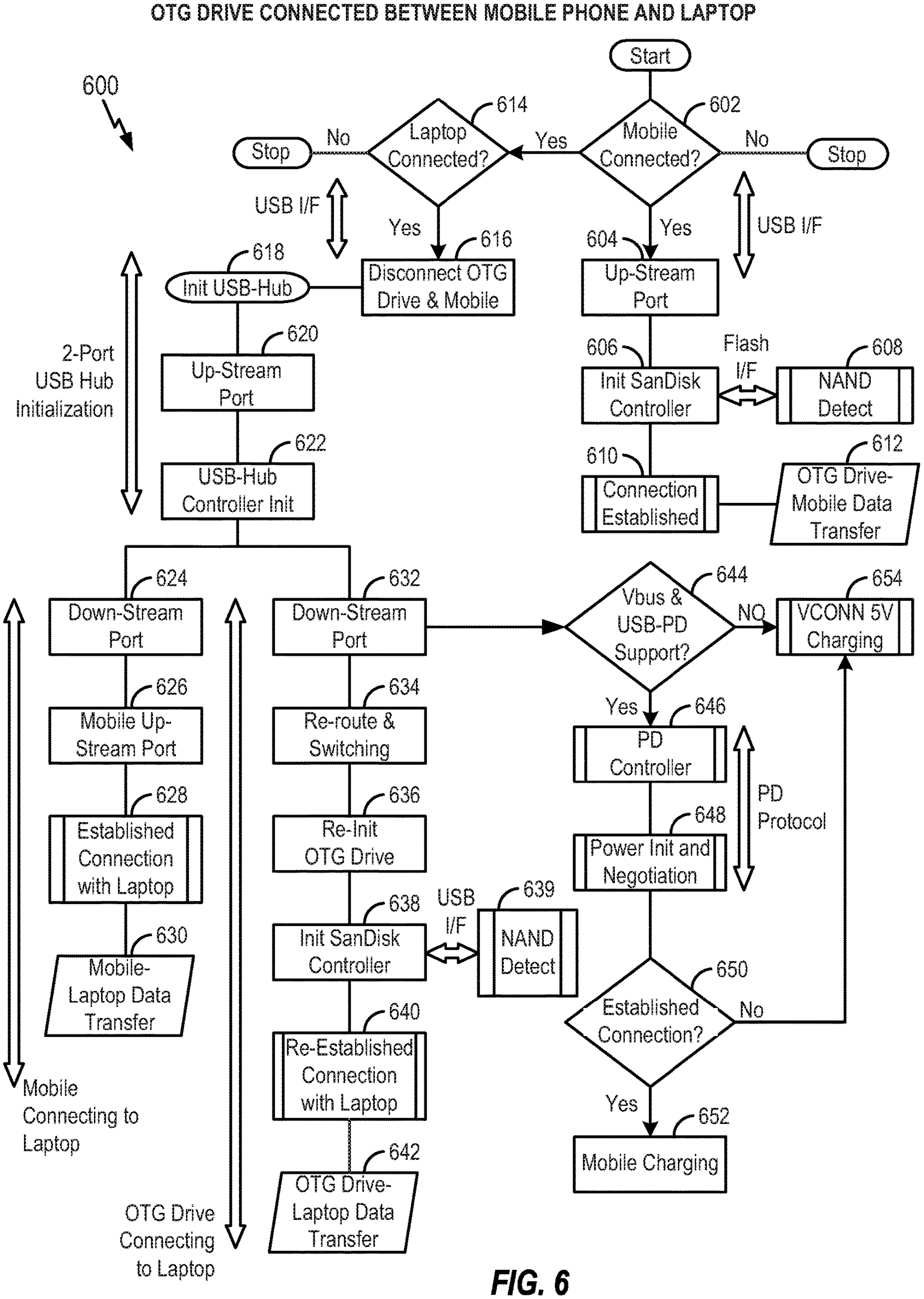
FIG. 6 is a flowchart of a procedure in accordance with a first use case scenario, wherein the OTG drive is connected to a mobile phone and a laptop at the same time, according to aspects of the present disclosure.

FIG. 6 is a flowchart of a procedure 600 in accordance with the first scenario wherein the OTG drive is connected between a mobile phone and a laptop at the same time. This supports charging simultaneously with data transfer between mobile internal storage, OTG drive storage, and the laptop. In this scenario, the main modules of FIG. 4 enabled include: the storage HUB 428, the primary/secondary host modules (e.g., 410, 412, 420), the storage controller 416, the VBUS/PD controller 434, the bridge/relay 424, and the charging switch 426.

Beginning at block 602, if a mobile device is connected, the upstream port is activated at block 604. If no mobile device is connected (i.e., the decision at block 602 is "no"), then no further action is taken since no mobile device is connected and the process flow stops. Following block 604, the OTG drive controller is activated at block 606 and a NAND detect is performed, at block 608. The NAND detect serves to verify and activate the NAND. A connection is established at block 610 between the mobile device and the OTG drive to enable OTG drive-mobile data transfer, at block 612. Additionally, when a mobile device is connected (as determined at block 602) then, at block 614, the OTG drive determines whether a laptop is also connected and, if so, the OTG drive and the mobile device connection are temporarily disconnected, at block 616, to enable a new USB hub connection to be established. If no laptop device is connected (i.e., the decision at block 614 is "no"), then no further action is taken following block 614 since the process flow of FIG. 6 is intended for the case where both a mobile device and a laptop are connected to the OTG drive. See the other figures described herein for other scenarios. At block 618, a USB-hub connection is initialized. The upstream port is activated, at block 620, and the USB hub controller is initialized at block 622. Note that blocks 618-622 represent a two-port USB hub initialization procedure.

The downstream port is then activated at block 624, followed by activation of the mobile upstream port, at block 626, which serves to reconnect the mobile device to the OTG drive. A connection to the laptop is established at block 628 which permits mobile-laptop data transfer, at block 630, which can include the transfer of data from laptop to mobile device and/or from mobile device to laptop. This also enables a laptop to access the internal memory of the mobile phone and/or enables a mobile device to access the memory of the laptop (assuming suitable access permissions are granted by the respective devices). Blocks 624-630 thus serve to connect the mobile to the laptop.

Concurrently, an OTG drive connection to the laptop sequence is performed which begins at block 632. The downstream port is activated at block 632. Rerouting and switching functions are activated at block 634, and then the OTG drive is reinitialized at block 636. At block 638, the NAND controller is initialized, which includes a NAND detect, at block 639. At block 640, a connection with the laptop is reestablished. At block 642, the transfer of data between the OTG drive and the laptop is performed. Note that at the system state of block 610, the system is running in the default state and directly connected to upstream port at block 604, which is connected to a mobile device. Once the laptop is connected to the USB-C socket 520 of FIG. 5, the charger/laptop detector circuit 522 of FIG. 5 identifies if the laptop or charger is connected. If a laptop connected at 614, then the OTG drive and mobile device are disconnected at 616 and the USB hub is initialized at 618. At this instance, the USB-Hub controller at 622 initializes two down-stream ports, 624 and 632. All the re-routing and switching occurs as described above. At this stage, the NAND controller 528 of FIG. 5 is in a disconnected state and needs to be re-initialized to establish a connection between the NAND controller 528 of FIG. 5 and the laptop 504 via the USB-hub controller 514 of FIG. 5. In other scenarios, the system establishes connections with mobile internal memory 507 and the laptop 504 of FIG. 5.

Additionally, as part of the OTG drive connection to the laptop procedure, following block 632, VBUS vs USB-PD support is detected or determined, at block 644. If USB-PD support is detected, then the PD controller is activated at block 646, followed (as part of PD protocol) with power initialization and negotiation, at block 648. Power negotiation can include determining which power/voltage/current levels may be applied to achieve fast charging. Thereafter, if a charging connection has been established at block 650, then mobile charging begins at block 652 via PD protocol. Otherwise, VBUS 5V charging is performed, at block 654. Note also that at decision block 644, if VBUS support is detected (rather than PD support), then processing proceeds directly to the VBUS 5V charging of block 654. Note that the mobile charging of block 652 can also be used to enable the charging of the mobile phone from power derived from the laptop (or other secondary device).

Figure 7:
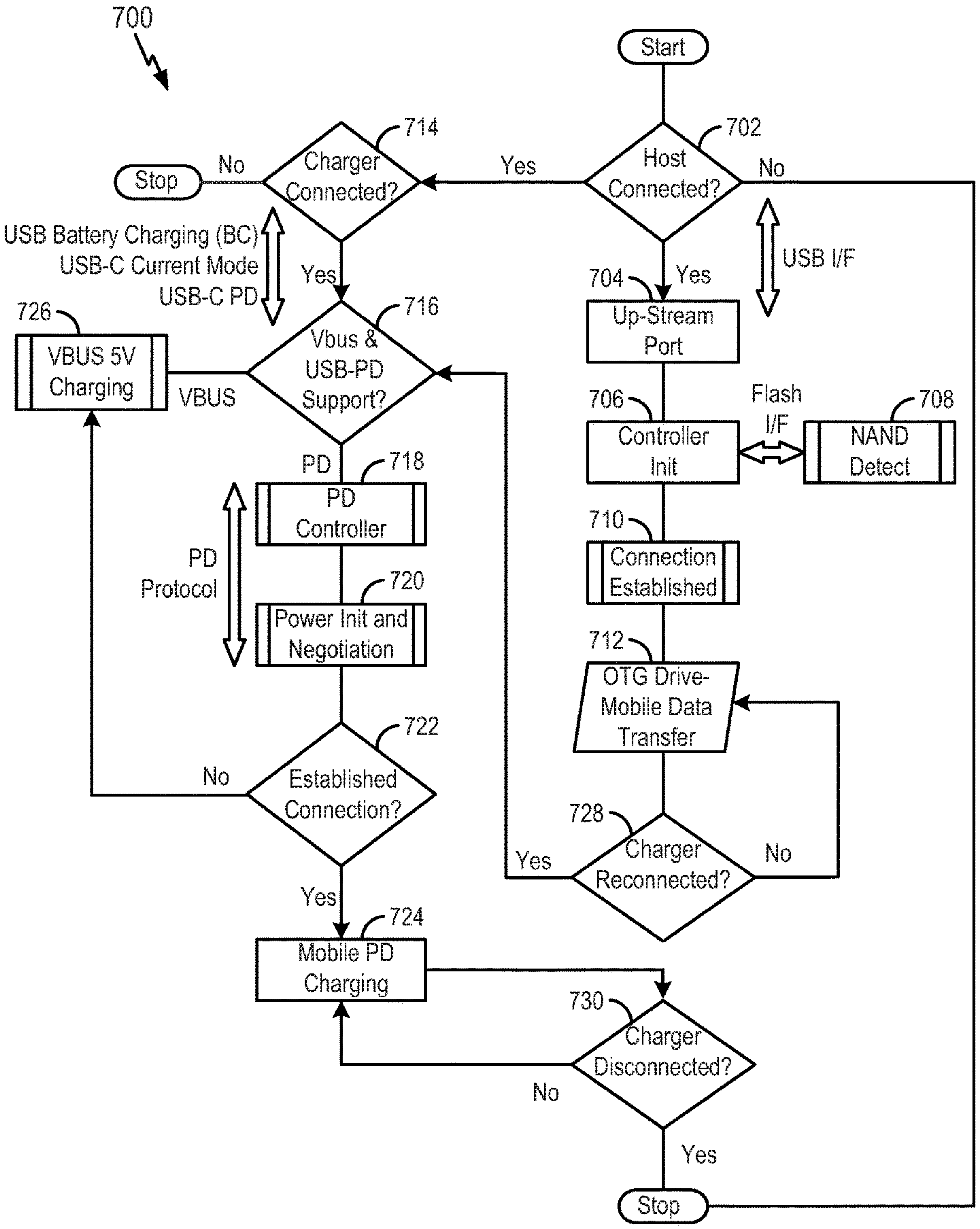
FIG. 7 is a flowchart of a procedure in accordance with a second use case scenario, wherein the OTG drive is connected to a mobile phone and a charger, according to aspects of the present disclosure.

FIG. 7 is a flowchart of a procedure 700 in accordance with the second use case scenario wherein the OTG drive is connected to a charger while supporting both mobile charging and data transfer simultaneously. In this scenario, the main modules that are enabled include: the primary host modules 410 and 412, the storage controller 416, the VBUS/PD controller 434, the relay 424, and the charging switch 432.

Beginning at block 702, if a host (e.g., mobile phone) is connected then, at block 704, the upstream port is activated and, at block 706, the NAND controller is initialized, which includes a NAND detect, at block 708. Next, at block 710, a connection is established between the OTG drive and the host (e.g., mobile device), and at block 712, OTG drive to mobile data transfer commences. Additionally, following detection block 702, the OTG drive determines whether a charger is also connected, at block 714. If no charger is connected, then no further action is taken following block 714 since the process flow of FIG. 7 is intended for the case where both a host (mobile device) and a charger are connected to the OTG drive. If a charger is connected, then a determination is made whether VBUS or USB-PD support is provided, at block 716. If USB-PD is supported, then, at block 718, the PD controller is activated, and at block 720, power initiation and negotiation are performed. Note that blocks 718 and 720 represent a PD protocol procedure. Thereafter, a determination is made at block 722 whether a connection has been established between the host (mobile phone) and the charger. If so, then mobile charging begins, at block 724; otherwise VBUS 5 V charging is performed, at block 726. Note that block 726 is also performed if VBUS is indicated at decision block 716.

Also, following block 712 while OTG drive to mobile data transfer is performed, a determination may be made, at block 728, whether the charger has been reconnected. If yes, then processing again proceeds to block 716 to determine whether the VBUS charging or USB-PD charging is to be performed. If the determination at block 728 is no, then further OTG drive-mobile data transfer is performed at block 712 until complete. Although not explicitly shown in the figure, once data transfer is complete and assuming the charger has not been reconnected, processing may stop. Furthermore, following block 724, a determination is made at block 730 whether the charger has been disconnected. If disconnected, then processing concludes. Otherwise, processing returns to (or continues in) block 724 for further mobile PD charging.

Thus, mobile charging at 724 indicates PD charging functionality. Power negotiation occurs via the PD controller at 718, which checks if the correct voltage has been selected at 720 and a PD connection has been established at 722. If the connection is properly established, PD mobile charging begins at 724. If the connected charger voltage is not supported, as determined at block 716, or no connection is established at 722, then the system enables only VBUS 5V charging at 726. Block 730 checks whether the charger is disconnected or removed while the OTG drive is in charging state of block 724. If disconnected at block 730, then no further charging operations are performed. If the charger is still connected as determined at block 730, then OTG drive continues mobile charging at block 724.

Note that block 728 pertains to the case where a USB-C female socket 520 (of FIG. 5) is free and the charger 523 is re-connected to the OTG drive 502 when the OTG drive is already connected to a mobile device 506. If the charger is reconnected, as determined at block 728, processing proceeds to block 716. If the charger is not reconnected at block 728, further data transfer may continue at 712. Note also that whenever a power connection is detected at block 714 to the USB-C socket port 520, the system checks for a VBUS or PD-supported charger at 716, and the system then follows the appropriate charging sequence.

Figure 8:
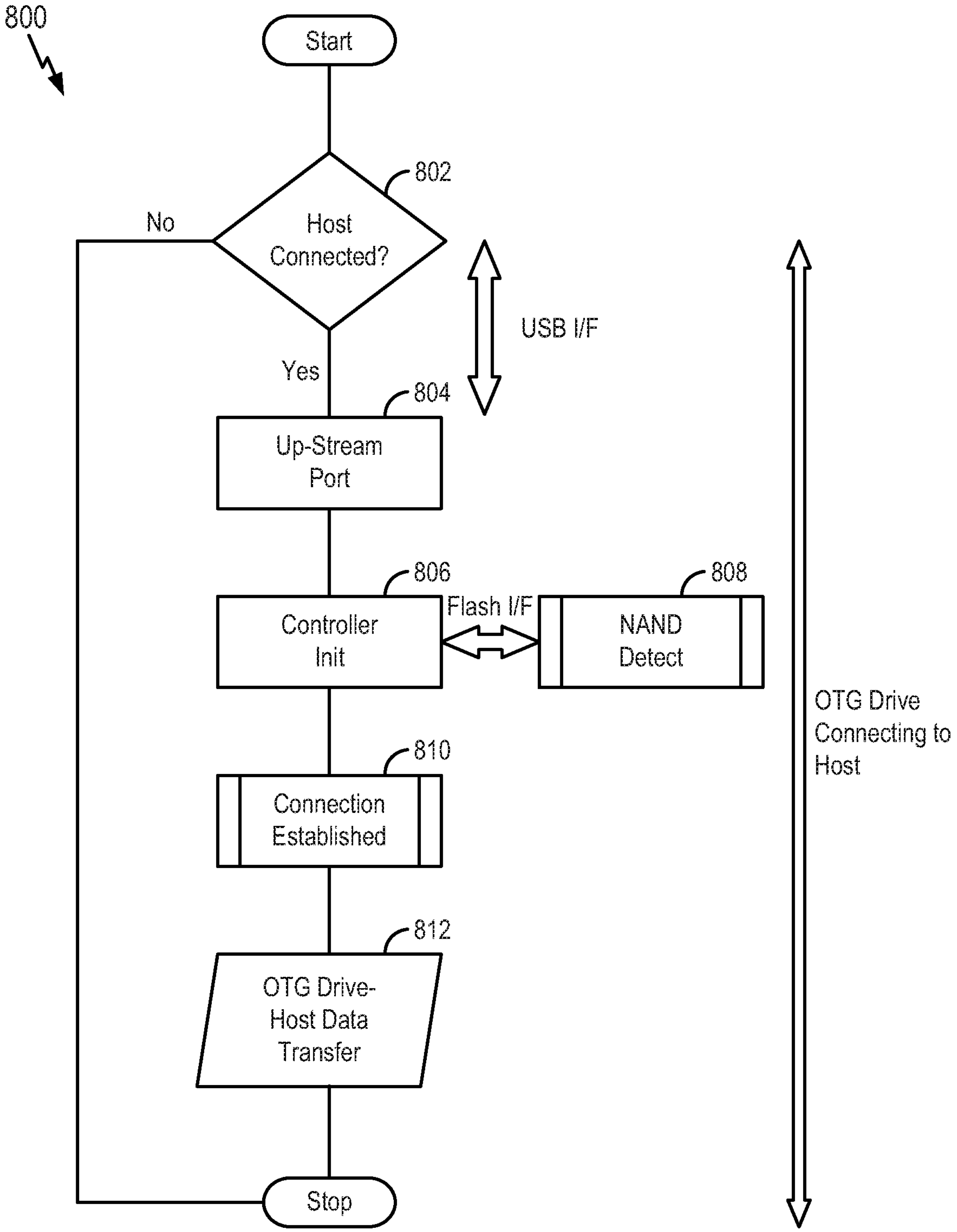
FIG. 8 is a flowchart of a procedure in accordance with a third use case scenario, wherein the OTG drive is connected only to a mobile phone, according to aspects of the present disclosure.

FIG. 8 is a flowchart of a procedure 800 in accordance with the third use case scenario wherein the OTG drive is connected to either a mobile phone, laptop, or other host so the OTG drive functions as an OTG drive (rather than a hub). Charging is not provided. In this scenario, the main modules that are enabled include: the primary host modules 410 and 412 and the storage controller 416.

Beginning at block 802, assuming that a host (e.g., a mobile phone) is connected, the upstream port is activated at block 804 and the NAND controller is initialized at block 806, which includes performing a NAND detect, at block 808. Following block 806, a connection to the host is established, at block 810. Thereafter OTG drive-host transfer proceeds, at block 812. Note that, at block 802, if no host is connected, no functions need be performed.

Figure 9:
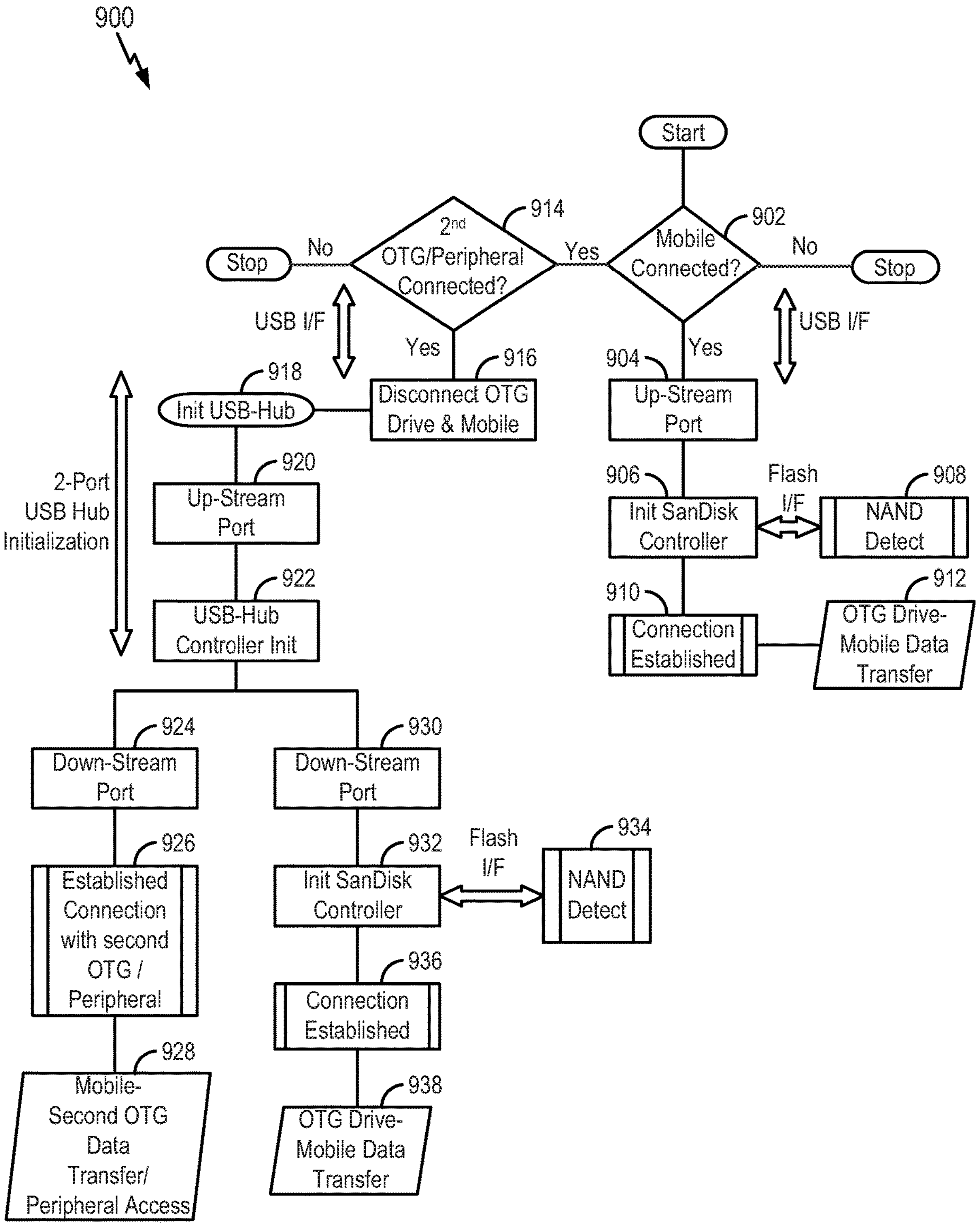
FIG. 9 is a flowchart of a procedure in accordance with a fourth use case scenario, wherein the OTG drive is connected to another OTG flash drive or peripheral, according to aspects of the present disclosure.

FIG. 9 is a flowchart of a procedure 900 in accordance with the fourth use case scenario wherein a first OTG drive is connected to a mobile and a second OTG flash drive (or other peripheral device). In this scenario, the main modules that are enabled include: the OTG detector 422, the storage HUB 428, the bridge 424, the charging switch 432, and the NAND data storage controller 416.

Beginning at decision block 902, if a mobile phone is connected, the upstream port is enabled at block 904 and the data storage controller of the OTG drive (i.e., the first drive) is initialized at block 906, which includes performing a NAND detect, at block 908. If no mobile device is connected (i.e., the decision at block 902 is "no"), then no further action is taken since no mobile device is connected and the process flow of FIG. 9 ends. Following block 906, a connection is established between the mobile phone and the OTG drive at block 910 to enable first OTG drive-to-mobile data transfer at block 912.

Additionally, if a mobile phone is connected at block 902, decision block 914 is also performed to determine whether a second OTG drive or other peripheral is connected. If a second OTG flash drive/peripheral is detected, then any ongoing connection between the first OTG drive and the mobile phone is disconnected at block 916 to permit 2-port USB hub initialization, which includes initialization of the USB hub at block 918. The upstream port is activated at block 920 and the USB hub controller is initialized at block 922. Following block 922, two processing streams commence. In the first stream, at block 924, the downstream port is initialized and a connection with the second OTG drive/peripheral is established at block 926. Thereafter, a mobile to second OTG drive/peripheral data transfer commences at block 928. Concurrently, in a second processing stream, beginning at block 930, the downstream port is also initialized. The data storage controller (of the first OTG drive) is initialized at block 932 including a NAND detect at block 934. A connection is established between the mobile device and the first OTG drive at block 936, thus enabling first OTG drive-mobile data transfer at block 938. Note that, at block 914, if a second OTG flash/peripheral is not connected (i.e., the decision at block 914 is "no"), then no further action is taken following block 914 since the process flow of FIG. 9 is intended for the case where both a mobile device and a second OTG/peripheral are connected to the OTG drive.

Exemplary OTG Drive Apparatus

Figure 10:
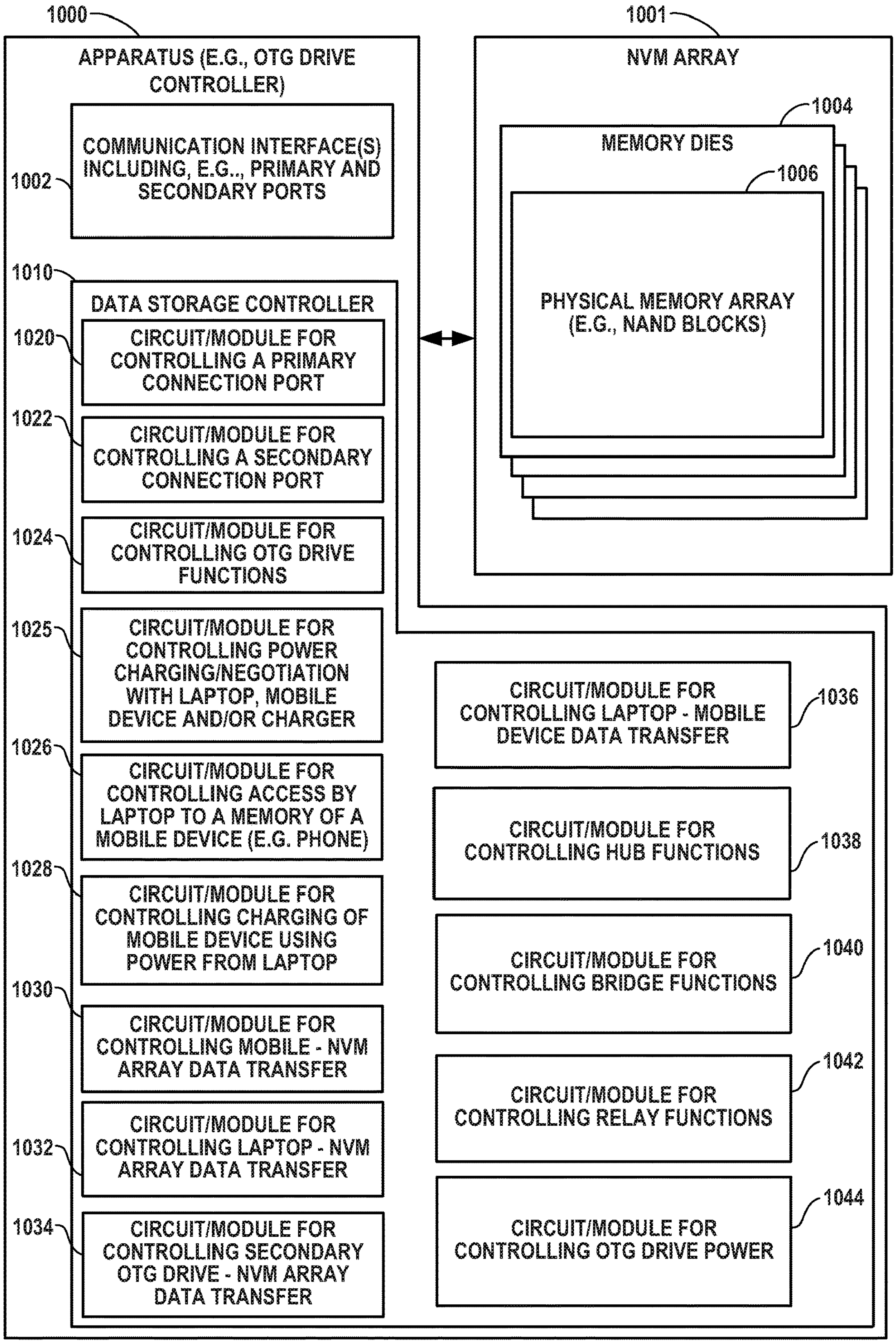
FIG. 10 is a schematic block diagram configuration for an exemplary apparatus, such as an OTG drive, configured according to aspects of the present disclosure.

FIG. 10 illustrates an embodiment of an apparatus 1000 configured according to one or more aspects of the disclosure. The apparatus 1000, or components thereof, could embody or be implemented as a data storage controller within an OTG drive, portable DSD, or other type of device that supports computations and data storage.

The apparatus 1000 is communicatively coupled to an NVM die array 1001 that includes one or more memory dies 1004, each of which may include physical memory arrays 1006, e.g., NAND blocks. In some examples, the memory dies may include on-chip circuitry such as under-the-array circuitry. The memory dies 1004 may be communicatively coupled to the apparatus 1000 such that the apparatus 1000 can read or sense information from, and write or program information to, the physical memory array 1006. That is, the physical memory array 1006 can be coupled to circuits of apparatus 1000 so that the physical memory array 1006 is accessible by the circuits of apparatus 1000. The dies may additionally include, e.g., input/output components, registers, voltage regulators, etc. The connection between the apparatus 1000 and the memory dies 1004 of the NVM die array 1001 may include, for example, one or more busses.

The apparatus 1000 includes a communication interface 1002 and a data storage controller 1010, which may include various modules/circuits, including firmware (FW) components. These components can be coupled to and/or placed in electrical communication with one another and with the NVM die array 1001 via suitable components, represented generally by connection lines in FIG. 10. Although not shown, other circuits such as timing sources, peripherals, voltage regulators, and power management circuits may be provided, which are well known in the art, and therefore, will not be described any further.

The communication interface 1002 may include primary and secondary ports (or upstream or downstream ports) for connecting, e.g., to a mobile phone, a laptop, a charger, another OTG drive or other peripheral using, e.g., USB, lightning, or other protocols. More generally, the communication interface 1002 provides a means for communicating with other apparatuses over a transmission medium. In some implementations, the communication interface 1002 includes circuitry and/or programming (e.g., a program) adapted to facilitate the communication of information bi-directionally with respect to one or more devices in a system. In some implementations, the communication interface 1002 may be configured for wire-based communication. For example, the communication interface 1002 could be a send/receive interface or some other type of signal interface including circuitry for outputting and/or obtaining signals (e.g., signals to/from a host). The communication interface 1002 serves as one example of a means for receiving and/or a means for transmitting.

The modules/circuits of the data storage controller 1010 are arranged or configured to obtain, process, and/or send data, control data access and storage, issue or respond to commands, and control other desired operations. For example, the modules/circuits 1010 may be implemented as one or more processors, one or more controllers, and/or other structures configured to perform functions. According to one or more aspects of the disclosure, the modules/circuits 1010 may be adapted to perform any or all of the features, processes, functions, operations, and/or routines described herein as being performed by the OTG drive controller. For example, the modules/circuits 1010 may be configured to perform any of the data storage controller steps, functions, and/or processes described with respect to FIGS. 1-9 and 11, discussed below.

As used herein, the term "adapted" in relation to the processing modules/circuits 1010 may refer to the modules/circuits being one or more of configured, employed, implemented, and/or programmed to perform a particular process, function, operation and/or routine according to various features described herein. The modules/circuits may include a specialized processor, such as an application-specific integrated circuit (ASIC) that serves as a means for (e.g., structure for) carrying out any one of the data storage controller operations described in conjunction with, e.g., FIGS. 1-9 and 11. The modules/circuits serve as an example of a means for processing. In various implementations, the modules/circuits may provide and/or incorporate, at least in part, functionality described above for the components in various embodiments shown, including for example OTG controller 108 of FIG. 1.

According to at least one example of the apparatus 1000, the processing modules/circuits 1010 may include one or more of: a circuit/module 1020 for controlling a primary connection port; a circuit/module 1022 for controlling a secondary connection port; a circuit/module 1024 for controlling overall OTG drive functions; a circuit/module 1025 for controlling power charging/negotiation with a laptop, mobile device, and/or charger (or other device); a circuit/module 1026 for controlling access by a laptop to the memory of a mobile device (such as a mobile phone); a circuit/module 1028 for controlling charging of a mobile device using power from a laptop (or other computer device); a circuit/module 1030 for controlling mobile-NVM array data transfer (e.g., upstream or downstream transfer of data between a mobile phone connected to the primary port and the NVM array 1001); a circuit/module 1032 for controlling laptop-NVM array data transfer (e.g., upstream or downstream transfer of data between a laptop connected to the secondary port and the NVM array 1001); a circuit/module 1034 for controlling secondary OTG drive-NVM array data transfer (e.g., upstream or downstream transfer of data between another OTG drive connected to the secondary port and the NVM array 1001); a circuit/module 1036 for controlling laptop-mobile device data transfer (e.g., upstream or downstream transfer of data between a laptop connected to the secondary port and a mobile phone connected to the primary port), which may include enabling or allowing a mobile phone to access the memory of a laptop or other computing device; a circuit/module 1038 for controlling hub functions; a circuit/module 1040 for controlling bridge functions; a circuit/module 1042 for controlling relay functions; and a circuit/module 1040 for controlling OTG drive power, such as deactivating particular modules when not in use such as HUB circuit/module 1038.

In at least some examples, means may be provided for performing the functions illustrated in FIG. 10 and/or other functions illustrated or described herein. For example, the means may include one or more of: means, such as circuit/module 1020, for controlling a primary connection port; means, such as circuit/module 1022, for controlling a secondary connection port; means, such as circuit/module 1024, for controlling overall OTG drive functions; means, such as circuit/module 1025, for controlling power charging/negotiation with a laptop, mobile device, and/or charger (or other device); means, such as circuit/module 1026, for controlling access by laptop to memory of mobile device (such as a mobile phone); a circuit/module 1028 for controlling charging of mobile device using power from laptop (or other computer device); a circuit/module 1030 for controlling mobile-NVM array data transfer (e.g., upstream or downstream transfer of data between a mobile phone connected to the primary port and the NVM array 1001); means, such as circuit/module 1032, for controlling laptop-NVM array data transfer (e.g., upstream or downstream transfer of data between a laptop connected to the secondary port and the NVM array 1001); means, such as circuit/module 1034, for controlling secondary OTG drive-NVM array data transfer (e.g., upstream or downstream transfer of data between another OTG drive connected to the secondary port and the NVM array 1001); means, such as circuit/module 1036, for controlling laptop-mobile device data transfer (e.g., upstream or downstream transfer of data between a laptop connected to the secondary port and a mobile phone connected to the primary port); means, such as circuit/module 1038, for controlling hub functions; means, such as circuit/module 1040, for controlling bridge functions; means, such as circuit/module 1042, for controlling relay functions; and means, such as circuit/module 1040, for controlling OTG drive power.

In yet another aspect of the disclosure, a non-transitory computer-readable medium is provided that has one or more instructions which when executed by a processing circuit in an OTG drive controller causes the controller of the OTG drive to perform one or more of the functions or operations listed above.

Additional Exemplary Embodiments

Figure 11:
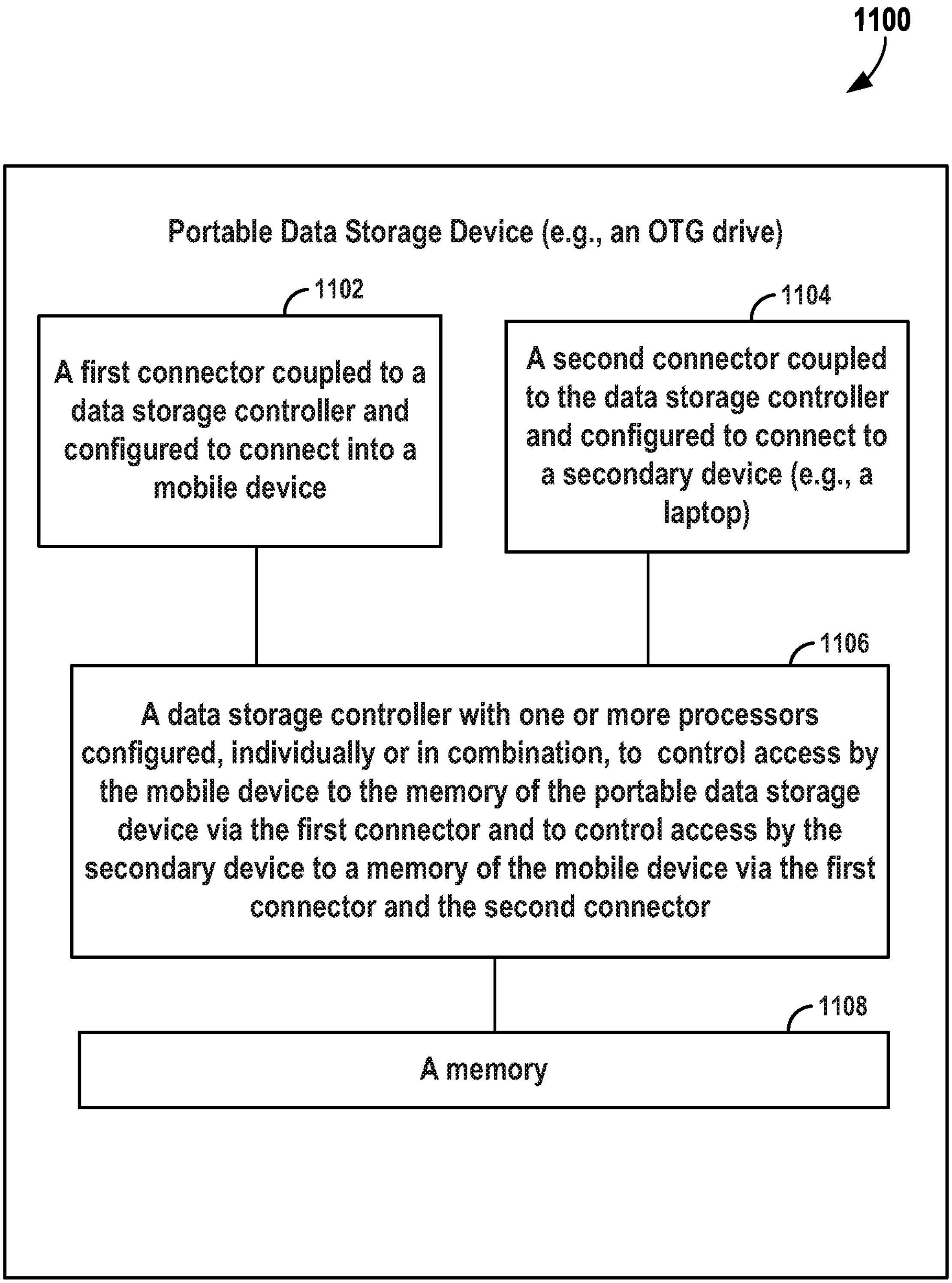
FIG. 11 is a schematic block diagram configuration for a portable data storage device configured according to aspects of the present disclosure.

FIG. 11 is a block diagram of an exemplary portable data storage device 1100 in accordance with some aspects of the disclosure. The data storage device 1100 includes: a first connector 1102 coupled to a data storage controller 1106 and configured to connect into a mobile device (e.g., mobile device 506 of FIG. 5) and a second connector 1104 coupled to the data storage controller 1106 and configured to connect to a secondary device (e.g., laptop 504 of FIG. 5). The data storage controller 1106 has one or more processors configured, individually or in combination, to control access by the mobile device to a memory 1108 of the portable data storage device via the first connector 1102 and to control access by the secondary device to a memory of the mobile device (e.g., memory 507 of FIG. 5) via the first and second connectors. The data storage controller may perform many other functions as well, including the various functions described above, such as controlling power charging. Moreover, as shown in, e.g., FIGS. 2-3, the portable data storage device may be physically configured to fit over the bottom end of a mobile device with: the body of the portable data storage device 1100 positioned along a back side of the mobile device, the first connector 1102 connected into a connection port on the bottom end of the mobile device, and the second connector 1104 oriented away from the mobile device to connect to the secondary device (via, for example, a USB cable that connects to a laptop).

In some aspects, the first and second connectors 1102 and 1104 are USB connectors and the data storage controller 1104 is configured to control the portable storage device 1100 to function as an OTG drive. The first connector 1102 may be a plug connector configured to insert into a socket connector of the mobile device, and the second connector 1104 may be a socket connector configured to receive a plug corrector of a USB cable that connects to a laptop. The secondary device may be a charger. The data storage controller may be configured to control power charging and power charging negotiation. The data storage controller may be further configured to control the charging of the mobile device using power from the laptop.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. See, also, 3D XPoint (3DXP)) memories. Each type of memory device may have different configurations. For example, flash memory devices may be configured in a NAND or a NOR configuration.

In addition to data storage devices, the NVM arrays (and associated circuitry and latches, where appropriate) in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components to such memory devices may be provided via one or more memory or system buses, including via interconnects such as Compute Express Link (CXL), Gen-Z, OpenCAPI, NVLink/NVSwitch, Infinity Fabric, Omni-Path, and other similar interconnect protocols. In other embodiments, the links between processing components to memory devices may be provided via on-die or die-to-die interconnects. In certain embodiments, the NVM arrays and associated circuitry may be co-located on the same die as the processing components such as CPU or GPU. In other examples, data may be stored in as hard disk drives (HDDs) or hybrid drives, etc.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combination. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bitline and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bitlines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of a non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements that span through multiple memory levels. Three-dimensional memory arrays may also be designed in a NOR configuration and a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but covers all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer-readable medium having stored thereon computer-executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application-specific integrated circuits. In addition, a computer-readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A portable data storage device, comprising:
- a body containing a data storage controller and a memory;
- a first connector coupled to the data storage controller and configured to connect into a mobile device; and
- a second connector coupled to the data storage controller and configured to connect to a secondary device;
- wherein the portable data storage device is configured to couple with a bottom end of the mobile device such that: the body of the portable data storage device is positioned along a back side of the mobile device, the first connector is connected into a first connection socket port of the mobile device that is on the bottom end of the mobile device, and the second connector is oriented away from the mobile device to connect to the secondary device;
- wherein the second connector of the portable storage device comprises a second connection socket port that is oriented in the same direction as the first connection socket port of the mobile device while the portable data storage device is coupled to the mobile device; and
- wherein a height and a width of the body are less than a height and a width of the mobile device, respectively.

2. The portable data storage device of claim 1, wherein the data storage controller comprises one or more processors configured, individually or in combination, to control access by the mobile device to the memory of the portable data storage device via the first connector and to control access by the secondary device to the memory of the portable data storage device via the second connector.

3. The portable data storage device of claim 1, wherein the first and second connectors are universal serial bus (USB) connectors, and wherein the data storage controller is further configured to control the portable data storage device to function as a USB on-the-go (OTG) device.

4. The portable data storage device of claim 1, wherein the data storage controller is further configured to control power charging and power charging negotiation functions.

5. The portable data storage device of claim 1, wherein the secondary device is a laptop computer connectable to the second connector using a connection cable.

6. The portable data storage device of claim 5, wherein the data storage controller is further configured to enable access by the laptop computer to a memory of the mobile device.

7. The portable data storage device of claim 5, wherein the data storage controller is further configured to control charging of the mobile device using power from the laptop computer.

8. The portable data storage device of claim 5, wherein the data storage controller is further configured to control data transfer between the mobile device and the laptop computer.

9. The portable data storage device of claim 1, wherein the secondary device is a second portable data storage device, and wherein the data storage controller is further configured to control transference of data between the second portable data storage device and the memory.

10. The portable data storage device of claim 1, wherein the mobile device is a mobile phone.

11. The portable data storage device of claim 1, wherein the data storage controller is further configured to:
- detect whether the secondary device is a host or a charger;
- control the access by the secondary device to the memory of the mobile device, in response to detecting that the secondary device is a host; and
- charge the mobile device using the secondary device, in response to detecting that the secondary device is a charger.

12. The portable data storage device of claim 11,
- wherein the data storage controller is further configured, in response to detecting that the secondary device is a charger, to control charging of the mobile device in accordance with universal serial bus (USB) VBUS charging; and
- wherein the data storage controller is further configured, in response to detecting that the secondary device is a host, to charge the mobile device in accordance with USB Power Delivery (PD) charging.

13. A portable data storage device, comprising:
- a data storage controller;
- a memory;
- a first connector coupled to the data storage controller and configured to connect into a mobile device;
- a second connector coupled to the data storage controller and configured to connect to a secondary device; and
- a body containing the data storage controller and the memory, wherein a height and a width of the body are less than a height and a width of the mobile device, respectively;
- wherein the data storage controller comprises one or more processors configured, individually or in combination, to control access by the mobile device to the memory of the portable data storage device via the first connector and further configured to:
  - detect whether the secondary device is a host or a charger;
  - control access by the secondary device to a memory of the mobile device via the first connector and the second connector, in response to detecting that the secondary device is a host; and
  - charge the mobile device using the secondary device, in response to detecting that the secondary device is a charger.

14. The portable data storage device of claim 13, wherein the mobile device is a mobile phone and the secondary device is a host that is a laptop computer.

15. The portable data storage device of claim 13, wherein the data storage controller is further configured to control access by the mobile device to the memory of the portable data storage device via the first connector and to control access by the secondary device to the memory of the portable data storage via the second connector, in response to detecting that the secondary device is a host.

16. The portable data storage device of claim 13, wherein the first and second connectors are universal serial bus (USB) connectors and wherein the data storage controller is further configured to control the portable storage device to function as a USB on-the-go (OTG) device.

17. The portable data storage device of claim 13,
- wherein the portable data storage device is configured to couple with a bottom end of the mobile device such that: the body of the portable data storage device is positioned along a back side of the mobile device, the first connector is connected into a first connection socket port of the mobile device that is on the bottom end of the mobile device, and the second connector is oriented away from the mobile device to connect to the secondary device; and wherein the second connector of the portable storage device comprises a second connection socket port that is oriented in the same direction as the first connection socket port of the mobile device while the portable data storage device is coupled to the mobile device.

18. The portable data storage device of claim 13, wherein the secondary device is a host that is a laptop computer, and wherein the data storage controller is further configured to control transference of data between the mobile device and the laptop computer.

19. The portable data storage device of claim 13, wherein the data storage controller is further configured, in response to detecting that the secondary device is a charger, to control charging of the mobile device in accordance with universal serial bus (USB) VBUS charging; and wherein the data storage controller is further configured, in response to detecting that the secondary device is a host, to charge the mobile device in accordance with USB Power Delivery (PD) charging.

20. An apparatus, comprising:

means for controlling the storage of data in a memory of the apparatus;

a first connector coupled to the means for controlling the storage of data and configured to connect into a mobile device;

a second connector coupled to the means for controlling the storage of data and configured to connect to a secondary device;

a body containing the means for controlling the storage of data and the memory, wherein a height and a width of the body are less than a height and a width of the mobile device, respectively;

means for detecting whether the secondary device is a host or a charger;

means, operative in response to detecting that the secondary device is a host, for controlling access by the secondary device to a memory of the mobile device via the first connector and the second connector;

means, operative in response to detecting that the secondary device is a charger, for charging the mobile device using the secondary device; and wherein the means for controlling the storage of data further comprises means for controlling access by the mobile device to the memory of the apparatus via the first connector.

* * * * *